United States Patent [19]
Farley

[11] Patent Number: 6,056,875
[45] Date of Patent: May 2, 2000

[54] SHOWER FILTER MEDIA

[76] Inventor: David K. Farley, Sprite Industries, 1827 Capital St., Corona, Calif. 91720

[21] Appl. No.: 09/246,881

[22] Filed: Feb. 8, 1999

Related U.S. Application Data

[60] Division of application No. 09/016,922, Feb. 2, 1998, Pat. No. 5,914,043, which is a continuation-in-part of application No. 08/703,943, Aug. 28, 1996, abandoned, which is a continuation-in-part of application No. 08/581,044, Dec. 29, 1995, abandoned.

[51] Int. Cl.[7] .................................................... B01D 39/06
[52] U.S. Cl. ........................ 210/263; 210/504; 252/178; 252/181
[58] Field of Search .................................... 210/263, 282, 210/290, 501, 502.1, 503, 504; 252/178, 181

[56] References Cited

U.S. PATENT DOCUMENTS

| | | | |
|---|---|---|---|
| 3,710,944 | 1/1973 | Budesheim | 210/266 |
| 3,746,174 | 7/1973 | Watanabe | 210/282 |
| 5,008,011 | 4/1991 | Underwood | 210/449 |

*Primary Examiner*—Ivars Cintins
*Attorney, Agent, or Firm*—James G. O'Neill

[57] ABSTRACT

A filtering material for filtering hot water in a shower utilizes ceramic-type calcium sulfite beads, made from a ceramic binder and calcium sulfite, and a copper-zinc media, with the ceramic-type calcium sulfite beads and the copper-zinc media being present in substantially equal volumetric portions.

13 Claims, No Drawings

SHOWER FILTER MEDIA

CROSS-REFERENCE TO RELATED APPLICATION

This application is a divisional application of application Ser. No. 09/016,922 filed Feb. 2, 1998, now U.S. Pat. No. 5,914,043, which is a Continuation-In-Part of application Ser. No. 08/703,943, filed Aug. 28, 1996, now abandoned, which is a Continuation-In-Part of application Ser. No. 08/581,044, filed on Dec. 29, 1995, now abandoned.

BACKGROUND OF THE INVENTION

1. Field of the Invention

This invention relates generally to treatment of fluids and more particularly to a method for increasing the efficiency of filter media in the removal of unwanted contaminants, such as chlorine, from hot water during showering.

2. Description of Related Art

Starting after the U.S. Civil War, the recognition and linking of macroscopic and microscopic pathogens to the aesthetic and health qualities of water resulted in the search for effective water disinfection and treatment procedures. Soon thereafter, chlorine was identified as a disinfecting agent. Towards the end of the 19th century, there were several recorded instances of the use of chlorine compounds for the disinfection of water and, with increasing experience, the effectiveness of chlorine treatment of water became more widely recognized and appreciated. The introduction of water chlorination, as a continuous process, occurred soon after the turn of the century. Currently, approximately 80% of all potable water systems in the U.S. contain chlorine as a disinfectant.

Different devices and methods for dechlorination of water have been used both at the point-of-entry ("POE") into a commercial, industrial or residential building, and the point-of-use ("POU") at the faucet, shower head or tap.

POE systems typically are in the form of an aerator, or a large organic or inorganic filtering media bed. Although applicable in some instances, these systems have potential problems, and have fallen under close scrutiny, due to the possibility of pathogenic reintroduction back into the water system, after the point of dechlorination. Because of this possibility, and the recent advancement in water treatment technology, POU water treatment systems have become widely accepted and are now primarily used in residential, and to a large degree, in commercial and industrial applications.

Both organic and inorganic filtering media are known for use in dechlorination. Carbon (organic) filtering media are used either alone, or in conjunction with other systems, such as reverse osmosis or distillation, or may be used with inorganic filtering media, such as cation/anion resins.

Currently, shower filters are known which use various types of materials to filter out impurities in water. However, the performance of such shower filters is restricted by the water's high flow rate and the high temperatures of the water. Traditional filtration methods have historically relied on carbon as the filtration media, using the process of adsorption to remove contaminants such as chlorine. The mechanics of adsorption involve a finite number of molecular attachment sites located in each granule of activated carbon. Often compared to a sponge, carbon "pulls" contaminants out of the water by an electrochemical charge located at each site. Used for removing the free and combined (or total) chlorine from drinking water at typically lower flow rates and at room temperature (25 degrees C.), carbon is quite effective.

However, carbon's shower water filtration efficiency is limited by the higher flow rate and high temperatures of shower water. In fact, carbon has a tendency to release previously adsorbed contaminants back into the water stream when temperatures approach the contaminants' boiling or vaporization point. Chlorine has a relatively low vaporization point. The releasing (off-loading) of chlorine begins when the water temperature is at about 90 degrees.

A partial solution to filtration of shower water at high temperatures and flow rates came with the use of granular copper and zinc. This media utilizes different filtration mechanics. Instead of pulling contaminants out of the water through the process of adsorption, as the carbon does, the copper and zinc (being very dissimilar metals) create an increased electro-negative potential in the water. Free chlorine is converted to an FDA "food grade" safe substance, zinc-chloride. This process is rather selective. Even though the free chlorine is converted, the many molecular combinations of chlorine (combined chlorine) are not affected, and remain in the water.

It is the free (uncombined) chlorine that is introduced into the water for disinfection purposes. It easily passes through the cell wall of the pathogen and attaches to the fatty acids in the cell creating complex chloro-compound. Once this occurs, cell functions cease and pathogen dies. The same processes occur when the human body is exposed to chlorine. Symptoms of chlorine exposure ranges from dry, itchy-flaking skin, scalp and hair to epidermal rash, and even to colon, liver and bladder cancer. Effective as copper-zinc filtration is, it also has its limits. In the case of chlorine, it is chlorine-free specific. That is to say that it only affects the free chlorine and not the combined chlorine. Copper-zinc has two main problems: 1) it cannot convert the multitude of combined chlorines; 2) it requires a temperature environment of over 90 degrees (F) to effectively convert the free chlorine.

Another type of prior art filter media is disclosed in U.S. Pat. Nos. 4,642,192 and 5,122,274, which disclose an "electronegative cell potential type" chlorine filter media. The preferred media to filter out chlorine disclosed in these patents is brass (a mixture of copper and zinc).

Two types of shower filters devices are disclosed in U.S. Pat. Nos. 5,152,464 and 5,300,224 to Fredrick A. Farley. The devices disclosed in these patents are compact filter assemblies containing a filtering media, such as copper and zinc, to filter out unwanted chlorine in water passing through the filters.

U.S. Pat. No. 2,582,388, discloses another prior art water filter, for insertion into a waterline, having two parts threaded together to form a shell or housing, with a plurality of screens held in an inlet to and an outlet from the interior thereof. Layers of activated charcoal, separated by a layer of silica and screens are arranged in the shell to filter water passing therethrough.

U.S. Pat. No. 3,760,951, incorporates 2,582,388 therein by reference, and discloses a similar water filter for insertion into a waterline by means of quick-disconnect bayonet fittings that allow the filter to be easily removed for cleaning or replacement.

U.S. Pat. No. 3,780,869, discloses a water filter, for insertion into a waterline, having a plurality of compartments with multiple filtering elements of sheep's wool therein.

U.S. Pat. No. 3,822,018, discloses a water filter, for insertion into a waterline, having two hemispherical sections joined together by threaded portions. The filter has a plurality of cylindrical filter elements annularly arranged therein containing natural wool, charcoal, cork and the like, and includes a valve for directing water through the filter elements or for directing water through the device, unfiltered.

U.S. Pat. No. 4,107,046, discloses a filter cartridge for an internally by-passable water purifier apparatus. The apparatus includes valve means for directing water through the filter cartridge, which contains granulated carbon mixed with a silver zeolite, and may be sandwiched between fibrous sheets of material, such as felt, before it exits the apparatus.

U.S. Pat. No. 4,172,796, discloses a water faucet having a water purification or filtering means, made from activated carbon, or carbon with oligodynamic silver, formed therein.

U.S. Pat. No. 4,504,389, discloses a water faucet having a separate housing containing a removable cartridge or filter element made from various stages of polyethylene and activated carbon particles therein.

U.S. Pat. No. 5,008,011, discloses a shower dechlorinator fabricated in the form of a short cylindrical filter housing having two separate end caps with inlet and outlet means for attachment between the outlet pipe for a shower and a shower head. The filter housing is filled with granulated or randomly oriented fibrous material in the form of a copper-zinc metal alloy.

While the foregoing prior art devices, filter media and methods provide improved filtration of water passing through them, they are not adapted to meet the health and safety standards of today, nor do they meet the requirements, such as in homes, that larger volumes of heated water having increased amounts of unwanted impurities therein be safely filtered out during showering. Furthermore, while the above-mentioned prior art provide some limited improvements in the filtering art, there remains the need in the art for a method that provides the most efficient filtering out of unwanted materials, such as chlorine, from hot water during showering, while at the same time meeting the more stringent health and safety regulations of local communities and such governmental agencies as the EPA.

SUMMARY OF THE INVENTION

Accordingly, it is a general object of the present invention to provide an improved shower water filtering method. It is a particular object of the present invention to provide an improved method for filtering contaminants from shower water. It is a still more particular object of the present invention to provide an improved method for filtering contaminants from hot water passing through a shower filter at high flow rates. It is yet a more particular object of the present invention to provide an improved shower water filtering method using non-soluble calcium sulfite. It is a further object of the present invention to provide a shower filter method that meets the demanding filtering capacity and temperature requirements of modern water supplies having higher concentrations of toxins therein, and at the same time meeting the more exacting governmental requirements for use with potable water, and the environmental concerns of less waste of materials and energy by improving the efficiency of the shower water filtering process.

In accordance with one aspect of the present invention, there is provided a method to treat shower water, and particularly hot water, passing through a bed of non-soluble calcium sulfite. The non-soluble calcium sulfite may be combined with copper-zinc, thus allowing for the improved treatment of hot shower water, at high flow rates.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an explanation of a novel fluid filtering media and method for use in filtering toxic substances, such as contaminants, from water.

It has been discovered that calcium sulfite ($CaSO_3$) when made substantially non-soluble, as by being combined with a ceramic binder, as described below, and used alone, or in combination with copper-zinc, produces unexpected and surprising results by eliminating more contaminates, such as total chlorine from shower water, over a longer period of time. In addition to its improved removal capabilities, it will effectively operate at temperatures as low as 55 degrees. A typical chemical conversion would be:

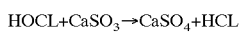

$$HOCL + CaSO_3 \rightarrow CaSO_4 + HCL$$

Calcium sulfite, which is naturally occurring or synthetically made, has been used, or suggested for use in filtering water. However, as pointed out in column 1, lines 14–18 of U.S. Pat. No. 3,746,174 and as is known in the water filtering industry, as water flows through the calcium sulfite, its effectiveness is decreased, and the calcium sulfite must be replaced in a short period of time. However, after the extensive testing of various materials and combinations of materials unsuccessfully, the present invention was found to provide a unique method of extending the life and usefulness of calcium sulfite when used alone, or in combination with a copper-zinc media, in approximately equal volumes. This inventive combination produced surprising and unexpected results.

Powdered or dehydrated calcium sulfite is highly soluble, and when added to water having chlorine therein produces calcium chloride, a salt which is not recommended or desired for drinking, bath or shower water. Therefore, calcium sulfite is primarily used in large commercial or industrial application, and because of the unacceptably high level of salt by-products, is not now used as a point-of-use drinking water filter media. Furthermore, because of the higher temperatures and flow rates produced when a typical 5 to 10 minute hot shower is taken, calcium sulfite is not used in, nor is it suitable for use in shower filters. That is, at the higher temperatures and flow rates in a shower filter, the calcium sulfite would dissolve even more rapidly, requiring constant replacement.

Applicant, however, has created "ceramic-type calcium sulfite beads" or particles by combining powdered calcium sulfite with ceramic binders, such as, but not limited to polyvinyl alcohol (PVA), polyethylene glycol (PEG) and polyacrylics. The ceramic-type calcium sulfite beads of the present invention are manufactured by using low temperature, insoluble ceramic binders. Unlike other forms of calcium sulfite agglomerates (particles), ceramic-type calcium sulfite is highly insensitive to re-hydration when immersed in water over long periods of time. Since the ceramic binder is insoluble, when combined with powdered calcium sulfite, the ceramic-type calcium sulfite agglomerate is insoluble. The importance of insolubility becomes evident when considering the higher temperatures, flow rates and volume of water associated with shower filtration. Particle integrity determines overall filtration performance.

Calcium sulfite and ceramic binders (preferably acrylic) can be mixed together using a variety of agglomeration (particle forming) processes. Currently, the ceramic-type beads of the present invention are formed in a disk pelletizer. Calcium sulfite is first milled to a fine powder and then tumbled in the disk pelletizer. Liquid acrylic ceramic binder is sprayed onto the powder through a spray bar causing the particles to adhere to each other. As the powder is tumbled, a "snowball effect" begins. The sprayed powder forms larger particles. Once the correct bead or particle size has been achieved, the moist particles are ready to be dried (dehydrated).

The drying process creates the ceramic-type beads or particles. When initially applied, the liquid ceramic binder is a copolymer chain. Dehydration transforms (unzips) the two-dimensional copolymer chain into a three dimensional ceramic polymer matrix. The integrity of the matrix depends on the extent of dehydration. The presence of a hydrated copolymer chain link within the partially dehydrated polymer matrix, impedes matrix bonding, significantly reducing the structural integrity of the matrix. The strength of the matrix is referred to as the "green strength" of the ceramic-type calcium sulfite beads. The green strength of the beads increases as they are dehydrated. Dehydration can be achieved by airing at room temperature or placing the beads in a form, or the like in an oven and firing (heating) to 400° C. The firing of the beads results in the greatest degree of particle dehydration. Dehydration of the ceramic-type calcium sulfite beads, surprisingly requires lower temperatures than the 1000° C. normally required by Legonosulfonates commonly used in the ceramic, refractory and brick industry.

The ceramic-type calcium sulfite beads of the present invention are formed with a hard exterior surface, but are still sufficiently porous that they may be used in a shower filter. As is well know, shower filters are subject to a greater flow of water at elevated temperatures and pressures, than is the case with drinking water coming from a faucet or tap. Furthermore, using these ceramic-type calcium sulfite beads with an equal mixture of a copper-zinc material, such as KDF, substantially elevates performance of the combined elements and entirely unexpected results are obtained. That is, the ceramic-type calcium sulfite beads and the copper-zinc material work longer and harder to remove all of the chlorine, not just free chlorine, from the elevated temperature water passing through the shower filter.

The hard exterior shell or surface of the ceramic-type calcium sulfite beads of the present invention allow the calcium sulfite to dissolve more slowly. Furthermore, as disclosed herein, the specific formulations have been found to optimize the advantages of the calcium sulfite/copper-zinc combination. Additionally, the present invention employs the unique use of and combination of materials herein disclosed in an inventive formulation or method that allows the materials used to act synergistically with each other to perform functions not taught or foreseen heretofore.

Specifically, the combination of the ceramic-type calcium sulfite beads and copper zinc herein disclosed, particularly in the specified ratio, greatly improves upon the filtering capabilities of known filter media in a totally unexpected manner. The increased filtering ability of the copper-zinc media by the addition of non-soluble ceramic-type calcium sulfite beads, is a result which was not foreseen or predicted in any prior art.

In the present invention, the use of the ceramic-type calcium sulfite beads in combination with the copper zinc, acts synergistically, not only to filter out contaminants from water, and particularly hot shower water, but also to enhance and expedite the shower filtering process, for a longer period of time, thus greatly increasing the effectiveness of the filtering process.

To prove the effectiveness of the present invention, a test bench was prepared consisting of the following set-Up:

A faucet-hose/multiple shower arm assembly was constructed and attached to hot and cold water outlets. The hot and cold water converged into a single hose so that water at temperature of 100° F., was passed through a selected one of the filters at a rate of 3.0 gals/min. A Chem-Tek Pulsafeeder (model 100/130) injected chlorine into the water at approximately two parts per million. The chlorinated water then ran to a 3-way diverter. Attached to the 3-way diverter was:

1 diverter—A first shower head and shower filter having only highly soluble, powdered calcium sulfite therein. After approximately 200 gallons of water had passed through the filter, the soluble calcium sulfite had completely dissolved. Furthermore, samples of the product water taken during this period when the calcium sulfite was dissolving revealed an unacceptably high level of calcium chloride—as high as 20–25 PPM.

2 diverter—A shower head and shower filter containing approximately 3 cubic inches or 18 ounces of ceramic-type calcium sulfite beads. During the passage of approximately 1,500 gallons of water through the filter, 100% of total chlorine was removed. This rate tapered off to approximately 75% removal of total chlorine at about 2,500 gallons. Calcium chloride levels ran at approximately 5–7 PPM during this time.

3 diverter—A shower head and shower filter containing approximately 50% of a copper-zinc media by volume and 50% ceramic-type calcium sulfite beads by volume. Total removal of 100% of total chlorine was achieved up to approximately the 2,500 gallons, while a drop off to 75% removal of total chlorine occurred at approximately 4,000 gallons. Calcium chloride levels dropped to 1–2 PPM.

Additionally, the ceramic-type calcium sulfite beads were tested alone. Approximately 3 cubic inches of the ceramic-type calcium sulfite beads were placed in a cartridge column and retained by a smaller mesh size screen placed at each end. The cartridge was inserted into a shower filter housing and attached to 100° F. water, flowing at 3.0 gallons per minute. The total chlorine content was at 2.0 parts per million. Traces of total chlorine were detected after only 180 gallons had passed through the filter. The testing was stopped and the cartridge removed from the housing. At that point, an equal amount by volume (3 cubic inches) of copper-zinc powder was added to the ceramic-type calcium beads and the test was resumed. Total chlorine was immediately eliminated and continued to show "no trace" in the shower water for over 2500 gallons, where chlorine started to bleed through. Thereafter, the removal rate of total chlorine dropped until it reached about 75% at approximately 4,000 gallons.

CONCLUSIONS

Results show that with a shower filter having ceramic-type calcium sulfite beads alone, improved results are obtained, while a combination of ceramic-type calcium sulfite beads and copper-zinc in relatively equal volumetric proportions, produces an unexpected enhancement in performance. That is, with the combination, a 66% increase in filtration capacity is obtained with a 66% reduction of the objectionable salt by-products.

To date, it is not exactly clear as to the entire reaction responsible for the ceramic-type calcium sulfite beads alone or in combination with copper-zinc dramatic performance. However, it appears that the copper-zinc maintains a priority of reducing the free chlorine, which in turn frees up working capacity of the ceramic-type calcium sulfite beads for removing the combined chlorine. On a more subtle level, the copper-zinc creates an electronegatively charged environment which not only reduces free chlorine, but increases the potential for other electrochemical reactions (in the form of reduction or oxidation) to occur. By-products produced by the soluble calcium sulfite were in such high concentrations that the brine may have masked any effect that an increased electronegative potential could have. However, by creating an insoluble calcium sulfite, in the form of ceramic-type beads, and therefore, greatly reducing the production of by-products, the additional electronegative charge associated with the introduction of the copper-zinc was "unveiled". In the concentration of 50—50 (% by volume) the added charge of the copper-zinc helped to drive the reaction that normally would require a higher concentration of calcium sulfite to overcome the higher energy threshold of the reaction that existed naturally when not exposed to the added e- potential.

That is, it appears that by reducing the solubility of calcium sulfite by providing it with a hard exterior surface, and introducing the electronegative charged environment, an unexpectedly low amount of material is required to obtain the desired results, i.e., remove chlorine and, therefore, as a bonus, an absolute minimum of objectionable by-products are created. This yields water that is fit for consumption, as well as improved use for showering.

The ceramic-type calcium sulfite beads have been or can be created by the process set forth above, or any other known process, in order to form the desired ceramic-type beads, or particulation. The resulting ceramic-type beads, or bead-like particles, are typically spherical or convoluted, but may be made into other shapes. The ceramic-type beads or particles are then sorted by mesh size and used as desired, or as called for. As discussed above, the ceramic-type calcium sulfite beads with the selected binder therein remove total chlorine in a more even and efficient manner, than heretofore was possible.

The ceramic-type calcium sulfite beads, alone or combined with copper-zinc, may be held within the internal chamber of any commercially available shower filter element or housing, mixed together or placed in separated beds. In a preferred embodiment, separate beds having approximately the same volume (50—50), are used to more effectively decontaminate hot water, passing through the shower filter at substantially any flow rate. Furthermore, it allows a much greater capacity or volume of water to be passed through the shower filter, while at the same time allowing water at elevated temperatures to be efficiently filtered or dechlorinated.

It, therefore, can be seen that the method or process of the present invention provides both an increased volume and temperature efficiency, in comparison to known filtering media and methods. Furthermore, as pointed out above, the combined media reacts even more completely with chlorine, to thereby produce a more complete dechlorination of water passing therethrough, for a longer period of time, thus producing savings in the use of energy and materials.

Accordingly, as will be apparent to those skilled in the art, the present invention provides considerable advantages in ease and flexibility of filtering chlorine or other unwanted substances from water, and particularly, provides a unique method for removing chlorine or other substances from hot water during showering. Specifically, the method disclosed herein more efficiently and safely removes chlorine and other toxic substances from water, even at elevated temperatures, without any known adverse health risks.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What I claim is:

1. A shower filter having therein a filter media to remove contaminants from hot water flowing through the shower filter, the shower filter media comprising non-soluble ceramic-type calcium sulfite beads and a copper-zinc media.

2. The shower filter of claim 1 wherein said ceramic-type calcium sulfite beads and said copper-zinc media are present in approximately equal volumetric portions.

3. The shower filter of claim 1 wherein said ceramic-type calcium sulfite beads are approximately 50% of the volume of said shower filter media.

4. The shower filter of claim 1 where in said ceramic-type calcium sulfite beads include a ceramic binder.

5. The shower filter of claim 4 wherein said ceramic binder is selected from the group consisting of polyvinyl alcohol, polyethylene glycol and polyacrylics.

6. The shower filter of claim 5 wherein said ceramic-type calcium sulfite beads and said copper-zinc are in approximately equal volumetric proportions.

7. The shower filter of claim 5 wherein said ceramic-type calcium sulfite beads are approximately 50% of the volume of the filter media in the shower filter.

8. A shower water filter having a filter media therein for filtering hot water under pressure passing therethrough, said filter media consisting of non-soluble ceramic-type calcium sulfite beads and a copper-zinc media, and said non-soluble ceramic-type calcium sulfite beads include a ceramic binder selected from the group consisting of polyvinyl alcohol, polyethylene glycol and polyacrylics.

9. The shower filter of claim 8 wherein said ceramic-type calcium sulfite beads and said copper-zinc are present in approximately equal volumetric portions.

10. The shower filter of claim 8 wherein said ceramic-type calcium sulfite beads are approximately 50% of the volume of said filter media.

11. A filter media to remove contaminants from hot water flowing through a shower filter, the filter media consisting essentially of non-soluble ceramic-type calcium sulfite beads and a copper-zinc media.

12. The filter media of claim 11 wherein said ceramic-type calcium sulfite beads and said copper-zinc are present in approximately equal volumetric portions.

13. The filter media of claim 11 where in said ceramic-type calcium sulfite beads are approximately 50% of the volume of said filter media.

* * * * *